United States Patent
Yang et al.

(10) Patent No.: US 10,286,457 B2
(45) Date of Patent: May 14, 2019

(54) FOUR-DIRECTIONAL DRILLING MACHINE

(71) Applicant: CITIC Dicastal CO., LTD, Qinhuangdao (CN)

(72) Inventors: Jinling Yang, Qinhuangdao (CN); Li Yang, Qinhuangdao (CN); Yingfeng Wang, Qinhuangdao (CN); Jiansheng Wang, Qinhuangdao (CN); Bicheng Ding, Qinhuangdao (CN); Yongwang Zhao, Qinhuangdao (CN)

(73) Assignee: CITIC DICASTAL CO., LTD (CN)

( * ) Notice: Subject to any disclaimer, the term of this patent is extended or adjusted under 35 U.S.C. 154(b) by 1 day.

(21) Appl. No.: 15/692,751

(22) Filed: Aug. 31, 2017

(65) Prior Publication Data

US 2018/0333788 A1 Nov. 22, 2018

(30) Foreign Application Priority Data

May 17, 2017 (CN) .......................... 2017 1 0348196

(51) Int. Cl.
*B23B 39/16* (2006.01)
*B23B 41/12* (2006.01)

(52) U.S. Cl.
CPC ............ *B23B 39/16* (2013.01); *B23B 41/12* (2013.01); *B23B 2270/16* (2013.01); *B23B 2270/58* (2013.01)

(58) Field of Classification Search
CPC ........... Y10T 408/378; Y10T 408/3784; Y10T 408/3788; Y10T 408/3792; Y10T 408/3796; Y10T 408/3806; Y10T 408/3809; Y10T 408/3839; Y10T 408/3844; B23B 39/16; B23B 39/003; B23B 39/02; B23B 39/22; B23B 2270/16; B23Q 2039/006

See application file for complete search history.

(56) References Cited

U.S. PATENT DOCUMENTS

| | | | | |
|---|---|---|---|---|
| 152,775 A * | 7/1874 | Stockwell | ............... | B23B 39/20 408/38 |
| 173,191 A * | 2/1876 | Stockwell | ............... | B23B 39/20 408/38 |
| 613,225 A * | 10/1898 | Pearson | .................. | B23B 39/22 408/39 |
| 1,511,164 A * | 10/1924 | Hey | ........................ | B23B 39/16 408/130 |
| 1,888,566 A * | 11/1932 | Park | ........................ | B23B 39/20 408/52 |

(Continued)

FOREIGN PATENT DOCUMENTS

| | | | | |
|---|---|---|---|---|
| DE | 3209214 A1 * | 9/1983 | ............. | B23B 39/22 |
| GB | 508660 A * | 7/1939 | ............. | B23B 39/16 |
| JP | WO 2013175831 A1 * | 11/2013 | ............... | B23Q 3/18 |

*Primary Examiner* — Daniel W Howell
(74) *Attorney, Agent, or Firm* — Calfee, Halter & Griswold LLP

(57) ABSTRACT

The present application discloses a four-directional drilling machine, comprising a main frame, a main machine platform, flange-type hydraulic cylinders, linear bearings, hydraulic piston rods, guide rods, nuts A, an upper pressure plate, drill bushings A, nuts B, monoblock drilling machines A, an upper supporting plate, positioning stop blocks, adjustable base assemblies, a left supporting plate, a drill bushing B, a right supporting plate and the like.

1 Claim, 3 Drawing Sheets

(56) References Cited

U.S. PATENT DOCUMENTS

| | | | | |
|---|---|---|---|---|
| 1,969,739 A | * | 8/1934 | Fitzpatrick | B27M 3/20 |
| | | | | 12/146 L |
| 1,973,204 A | * | 9/1934 | Goss | B23Q 17/24 |
| | | | | 144/2.1 |
| 1,978,879 A | * | 10/1934 | Ferris | B23B 39/22 |
| | | | | 408/10 |
| 2,101,396 A | * | 12/1937 | Kingsbury | B23B 39/16 |
| | | | | 408/50 |
| 2,302,878 A | * | 11/1942 | Muhl | B23Q 7/1489 |
| | | | | 144/245.6 |
| 2,318,619 A | * | 5/1943 | Noel | B23Q 39/042 |
| | | | | 29/38 C |
| 2,369,828 A | * | 2/1945 | Humphreys | B23Q 5/04 |
| | | | | 408/14 |
| 3,041,896 A | * | 7/1962 | May | B23B 39/003 |
| | | | | 408/11 |

\* cited by examiner

FOUR-DIRECTIONAL DRILLING MACHINE

CROSS-REFERENCE TO RELATED APPLICATIONS

This application claims priority to Chinese Patent Application No. 201710348196.7 filed on May 17, 2017, which is hereby incorporated by reference in its entirety.

TECHNICAL FIELD

The present application relates to a drilling machine, and specifically to a four-directional drilling machine.

BACKGROUND ART

In practical production, an automobile housing or a valve part needs to be machined with holes in four directions, and a common drilling machine can only be used for machining in one direction, so that much clamping time is wasted, the clamping efficiency is low, and the production efficiency is influenced.

SUMMARY OF THE INVENTION

The present application is aimed at providing an automatic and systemic four-directional drilling machine.

To fulfill the above aim, the present application adopts the following technical solution: a four-directional drilling machine includes a main frame, a main machine platform, flange-type hydraulic cylinders, linear bearings, hydraulic piston rods, guide rods, nuts A, an upper pressure plate, drill bushings A, nuts B, monoblock drilling machines A, an upper supporting plate, positioning stop blocks, adjustable base assemblies, a left supporting plate, a drill bushing B, a right supporting plate, a drill bushing C, a drill bushing D, a supporting plate A, a monoblock drilling machine B, positioning flange hydraulic cylinders, sliding positioning trays, a push plate, a supporting plate B, a hydraulic cylinder and rails.

The main frame is arranged on the adjustable base assemblies, the main machine platform is arranged on the main frame, the left supporting plate and the right supporting plate are arranged on the main machine platform of the four-directional drilling machine, the rails are arranged on the main machine platform of the four-directional drilling machine, and the positioning stop blocks are arranged on the sliding positioning trays. The flange-type hydraulic cylinders are connected to the lower surfaces of the main machine platform of the four-directional drilling machine, and simultaneously, the linear bearings are arranged in the main machine platform of the four-directional drilling machine. The hydraulic piston rods are connected to the upper pressure plate and pass through the linear bearings, and the guide rods are connected to the upper pressure plate and pass through the linear bearings. The drill bushings A are arranged in the upper pressure plate. The drill bushing B is arranged in the left supporting plate, and the drill bushing C is arranged in the right supporting plate. The upper supporting plate is arranged on the upper pressure plate. The drill bushing D is arranged in the sliding positioning tray and in the main machine platform of the four-directional drilling machine, the monoblock drilling machines A are arranged on the upper supporting plate, the monoblock drilling machine B is arranged on the supporting plate A which is below the main machine platform of the four-directional drilling machine, and drill bits of the monoblock drilling machine A and the monoblock drilling machine B are simultaneously fed to drill a machined workpiece in four directions. The two positioning flange hydraulic cylinders are respectively arranged on the left supporting plate and the right supporting plate, the sliding positioning tray is arranged on the main machine platform of the four-directional drilling machine, and the hydraulic cylinder and the push plate push the sliding positioning tray to advance. Piston rods of the positioning flange hydraulic cylinders are inserted into the sliding positioning tray, and the piston rods of the positioning flange hydraulic cylinders are provided with a positioning pit respectively on the left and the right for positioning the sliding positioning tray. The two rails are arranged on the main machine platform.

In practical use, a workpiece is placed among the positioning stop blocks on one sliding positioning tray, the sliding positioning tray is pushed to advance by the push plate connected with the piston rod of the hydraulic cylinder, the piston rods of the positioning flange hydraulic cylinders stretch into the sliding positioning tray, and the sliding positioning tray is positioned by the positioning pits, that is, the upper pressure plate is just above the workpiece. The hydraulic piston rods of the flange-type hydraulic cylinders are pulled down, and the two guide rods also move down. The drill bits of the monoblock drilling machines A and the monoblock drilling machine unit B are simultaneously fed, and drill the machined workpiece with holes on the left, right, upper and lower sides in a numerical control manner under the guiding actions of the drill bushings A, the drill bushing B, the drill bushing C and the drill bushing D. The piston rods of the positioning flange hydraulic cylinders retract and are separated from the positioning pits of the sliding positioning tray, the hydraulic cylinder and the push plate push the sliding positioning tray to advance on the rails, the rear sliding positioning tray pushes the front sliding positioning tray machining the workpiece, and an automatic continuous machining process is thus realized.

Compared with the existing drilling machines, the present application has the advantages that the four-directional drilling machine may reduce the clamping time, is reasonable and compact in clamping and pushing, improves the production efficiency, and meets the requirements for clamping and machining an automobile housing having holes on the left, right, upper and lower sides.

DETAILED DESCRIPTION OF THE INVENTION

Figure 1:
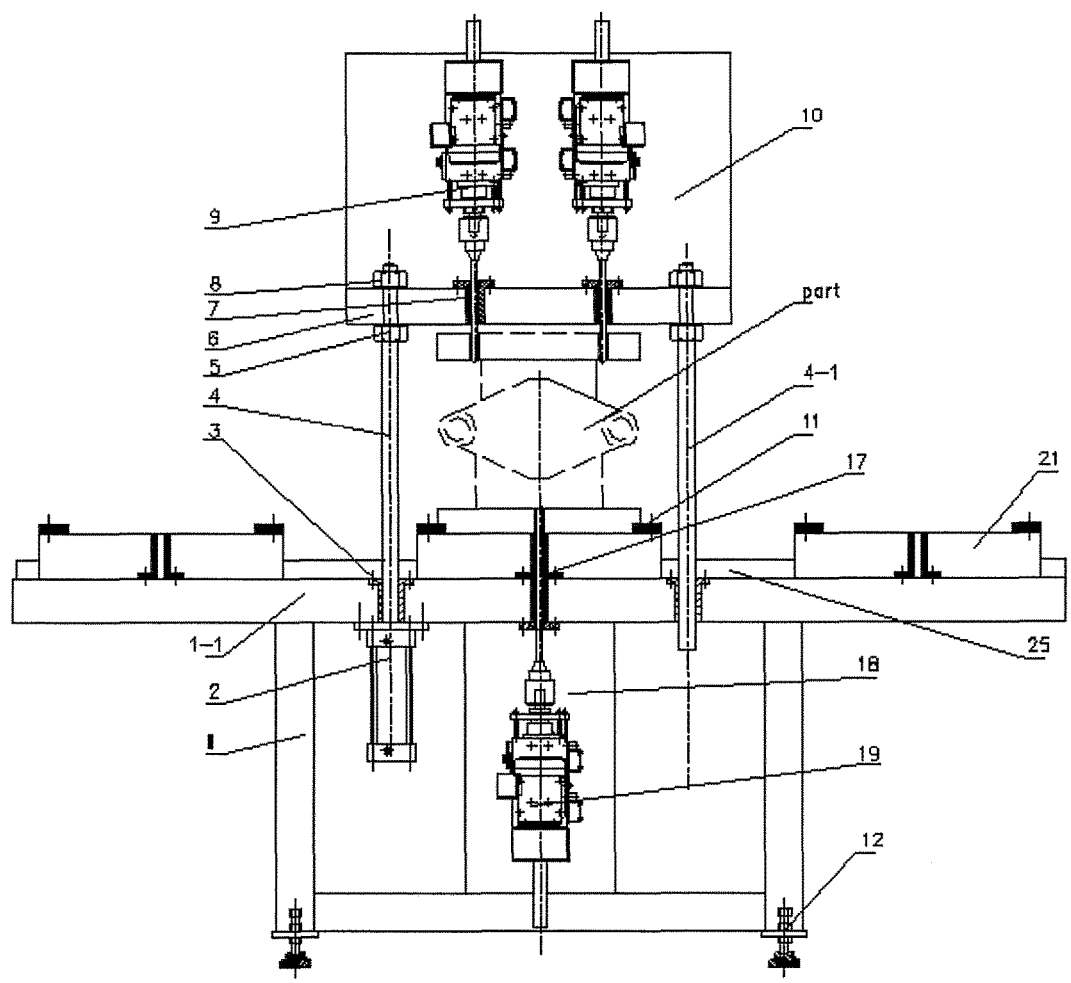
FIG. 1 is a schematic front view of a four-directional drilling machine of the present application.
Figure 2:
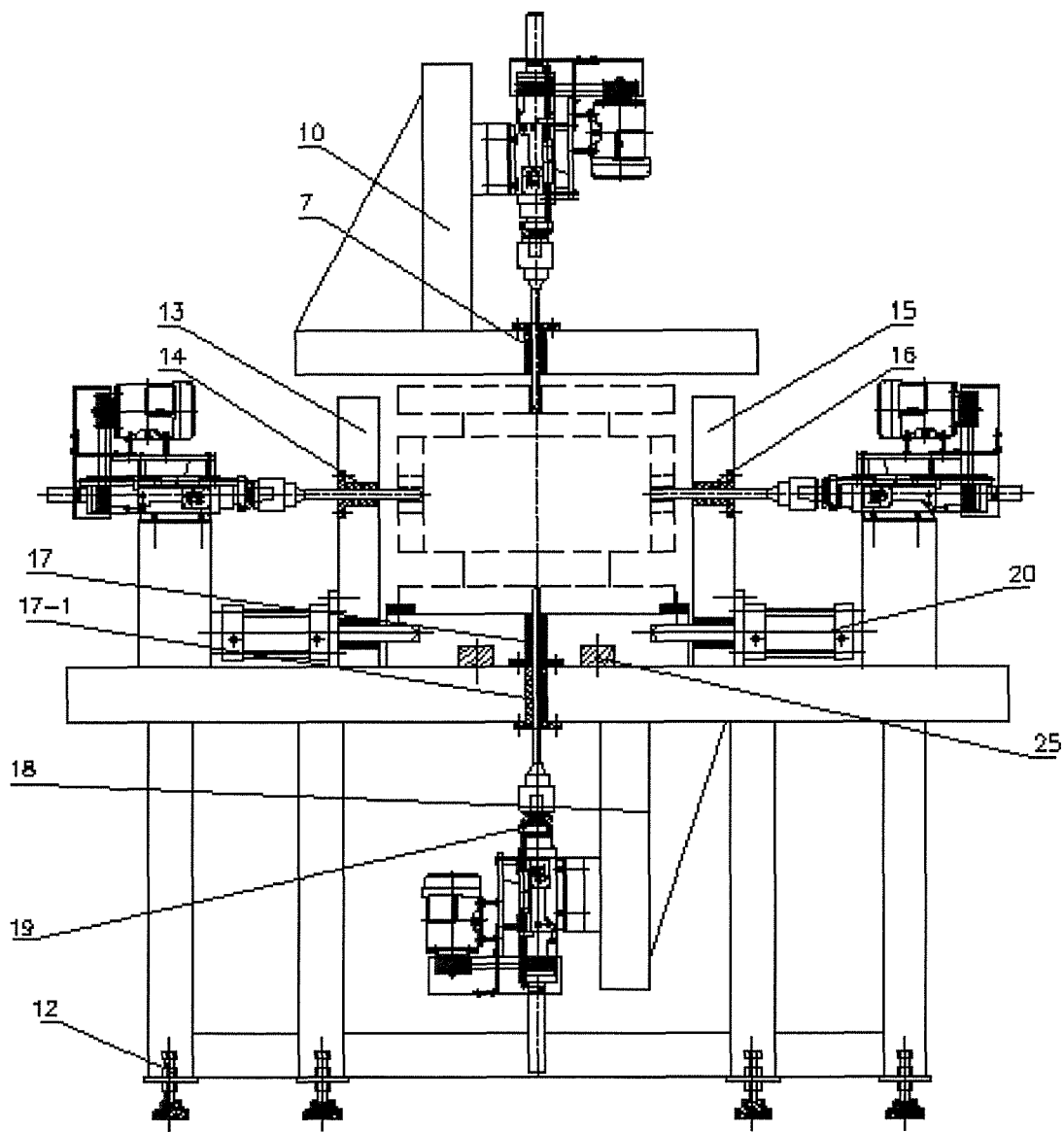
FIG. 2 is a schematic side view of the four-directional drilling machine of the present application.
Figure 3:
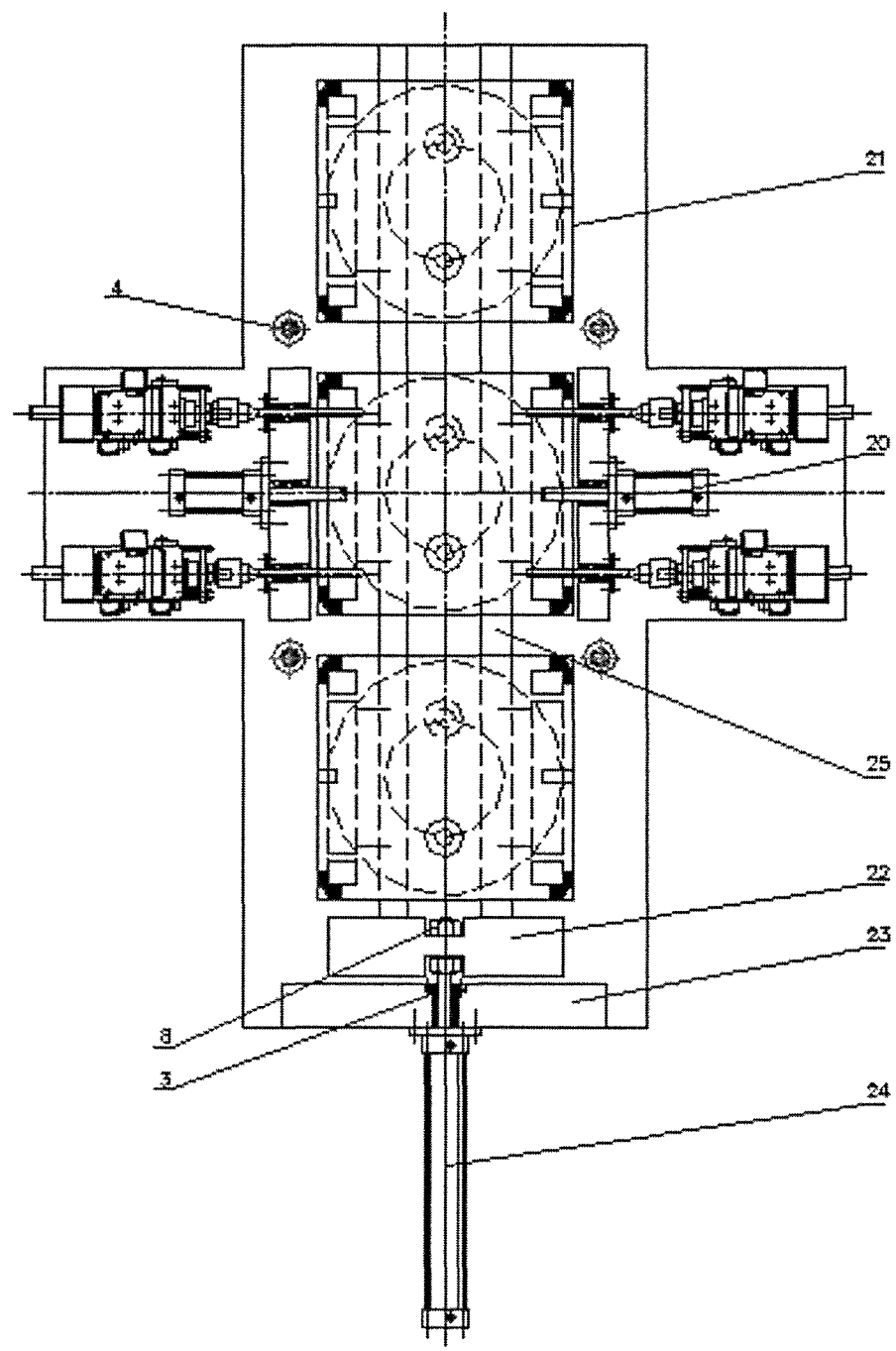
FIG. 3 is a schematic top view of the four-directional drilling machine of the present application after the upper pressure plate is removed.

The details and working conditions of the specific device provided by the present application will be specified below in combination with the accompanying drawings.

A four-directional drilling machine includes a main frame 1, a main machine platform 1-1, flange-type hydraulic cylinders 2, linear bearings 3, hydraulic piston rods 4, guide rods 4-1, nuts A 5, an upper pressure plate 6, drill bushings A 7, nuts B 8, monoblock drilling machines A 9, an upper supporting plate 10, positioning stop blocks 11, adjustable base assemblies 12, a left supporting plate 13, a drill bushing B 14, a right supporting plate 15, a drill bushing C 16, a drill bushing D 17, a supporting plate A 18, a monoblock drilling machine B 19, positioning flange hydraulic cylinders 20, sliding positioning trays 21, a push plate 22, a supporting plate B 23, a hydraulic cylinder 24 and rails 25.

The main frame 1 is arranged on the adjustable base assemblies 12, the main machine platform 1-1 is arranged on the main frame 1, the left supporting plate 13 and the right supporting plate 15 are arranged on the main machine platform 1-1 of the four-directional drilling machine, the rails 25 are arranged on the main machine platform 1-1 of the four-directional drilling machine, and the positioning stop blocks 11 are arranged on the sliding positioning trays 21. The flange-type hydraulic cylinders 2 are connected to the lower surfaces of the main machine platform 1-1 of the four-directional drilling machine, and simultaneously, the linear bearings 3 are arranged in the machine platform 1-1 of the four-directional drilling machine. The hydraulic piston rods 4 are connected to the upper pressure plate 6 and pass through the linear bearings 3, and the guide rods 4-1 are connected to the upper pressure plate 6 and pass through the linear bearings 3. The drill bushings A 7 are arranged in the upper pressure plate 6. The drill bushing B 14 is arranged in the left supporting plate 13, and the drill bushing C 16 is arranged in the right supporting plate 15. The upper supporting plate 10 is arranged on the upper pressure plate 6. The drill bushing D 17 is arranged in the sliding positioning tray 21 and in the main machine platform 1-1 of the four-directional drilling machine, the monoblock drilling machines A 9 are arranged on the upper supporting plate 10, the monoblock drilling machine B 19 is arranged on the supporting plate A 18 which is below the main machine platform 1-1 of the four-directional drilling machine, and drill bits of the monoblock drilling machines A 9 and the monoblock drilling machine B 19 are simultaneously fed to drill a machined workpiece in four directions. The two positioning flange hydraulic cylinders 20 are respectively arranged on the left supporting plate 13 and the right supporting plate 15. The sliding positioning tray 21 is arranged on the main machine platform 1-1 of the four-directional drilling machine, and the hydraulic cylinder 24 and the push plate 22 push the sliding positioning tray 21 to advance. Piston rods of the positioning flange hydraulic cylinders 20 are inserted into the sliding positioning tray 21, and the piston rods of the positioning flange hydraulic cylinders 20 are provided with a positioning pit respectively on the left and the right for positioning the sliding positioning tray 21. The two rails 25 are arranged on the main machine platform 1-1.

In practical use, a workpiece is placed among the positioning stop blocks 11 on one sliding positioning tray 21, the sliding positioning tray 21 is pushed to advance by the push plate 22 connected with the piston rod of the hydraulic cylinder 24, the piston rods of the positioning flange hydraulic cylinders 20 stretch into the sliding positioning tray 21, and the sliding positioning tray 21 is positioned by the positioning pits, that is, the upper pressure plate 6 is just above the workpiece. The hydraulic piston rods 4 of the flange-type hydraulic cylinders 2 are pulled down, and the two guide rods 4-1 also move down. The drill bits of the monoblock drilling machines A 9 and the monoblock drilling machine B 19 are simultaneously fed, and drill the machined workpiece with holes on the left, right, upper and lower sides in a numerical control manner under the guiding actions of the drill bushings A 7, the drill bushing B 14, the drill bushing C 16 and the drill bushing D 17. The piston rods of the positioning flange hydraulic cylinders 20 retract and are separated from the positioning pits of the sliding positioning tray 21, the hydraulic cylinder 24 and the push plate 22 push the sliding positioning tray 21 to advance on the rails 25, and the rear sliding positioning tray 21 pushes the front sliding positioning tray 21 machining the workpiece, and an automatic continuous machining process is thus realized.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A four-directional drilling machine, comprising a main frame, a main machine platform, first flange-type hydraulic cylinders, linear bearings, hydraulic piston rods, guide rods, an upper pressure plate, first drill bushings, first monoblock drilling machines, an upper supporting plate, positioning stop blocks, adjustable base assemblies, a left supporting plate, a second drill bushing, a right supporting plate, third drill bushing, fourth drill bushings, a first supporting plate, a second monoblock drilling machine, two positioning flange hydraulic cylinders, sliding positioning pallets, a push plate, a push hydraulic cylinder mounted on a second supporting plate, and two rails, wherein the main frame is arranged on the adjustable base assemblies, the main machine platform is arranged on the main frame, the left supporting plate and the right supporting plate are arranged on the main machine platform of the four-directional drilling machine, the two rails are arranged on the main machine platform of the four-directional drilling machine, and the positioning stop blocks are arranged on the sliding positioning pallets; the first flange-type hydraulic cylinders are connected to lower surfaces of the main machine platform of the four-directional drilling machine, and simultaneously, the linear bearings are arranged in the machine platform of the four-directional drilling machine; the hydraulic piston rods are connected to the upper pressure plate and pass through the linear bearings, and the guide rods are connected to the upper pressure plate and pass through the linear bearings; the first drill bushings are arranged in the upper pressure plate; the second drill bushing is arranged in the left supporting plate, and the third drill bushing is arranged in the right supporting plate; the upper supporting plate is arranged on the upper pressure plate; one of the fourth drill bushings in the main machine platform of the four-directional drilling machine and others of the fourth drill bushings are arranged in the sliding positioning pallet, the first monoblock drilling machines are arranged on the upper supporting plate, the second monoblock drilling machine is arranged on the first supporting plate which is below the main machine platform of the four-directional drilling machine, and drill bits of the first monoblock drilling machines and the second monoblock drilling machine are simultaneously fed to drill a machined workpiece in four directions; the two positioning flange hydraulic cylinders are respectively arranged on the left supporting plate and the right supporting plate; the sliding positioning pallet is arranged on the main machine platform of the four-directional drilling machine, and the push hydraulic cylinder and the push plate push the sliding positioning pallet to advance; piston rods of the two positioning flange hydraulic cylinders are inserted into the sliding positioning pallet, and the sliding positioning pallet is provided with a positioning pit respectively on left and right for positioning the sliding positioning pallet;

in practical use, a workpiece is placed among the positioning stop blocks on one sliding positioning pallet, the sliding positioning pallet is pushed to advance by the push plate connected with the piston rod of the push hydraulic cylinder, the piston rods of the two positioning flange hydraulic cylinders stretch into the sliding positioning pallet, and the sliding positioning pallet is positioned by the positioning pits, that is, the upper pressure plate is just above the workpiece; The hydraulic piston rods of the first flange-type hydraulic cylinders are pulled down, and the two guide rods also move down; The drill bits of the first monoblock drilling machines and the second monoblock drilling machine are simultaneously fed, and drill the machined workpiece with holes on the left, right, upper and lower sides in a numerical control manner under the guiding actions of the first drill bushings, the second drill bushing, the third drill bushing and the fourth drill bushing; The piston rods of the two positioning flange hydraulic cylinders retract and are separated from the positioning pits of the sliding positioning pallet, the push hydraulic cylinder and the push plate push the sliding positioning pallet to advance on the rails, the rear sliding positioning pallet pushes the front sliding positioning pallet machining the workpiece, and an automatic continuous machining process is thus realized.

* * * * *